A. L. HAMLIN.
SELF LUMINOUS INDEX HAND.
APPLICATION FILED SEPT. 16, 1918.

1,364,368. Patented Jan. 4, 1921.

Inventor
Allen L. Hamlin
By his Attorney
Albert T. Day

UNITED STATES PATENT OFFICE.

ALLEN L. HAMLIN, OF EAST ORANGE, NEW JERSEY, ASSIGNOR TO RADIUM LUMINOUS MATERIAL CORPORATION, OF NEW YORK, N. Y., A CORPORATION OF DELAWARE.

SELF-LUMINOUS INDEX-HAND.

1,364,368.   Specification of Letters Patent.   Patented Jan. 4, 1921.

Application filed September 16, 1918.  Serial No. 254,169.

*To all whom it may concern:*

Be it known that I, ALLEN L. HAMLIN, a citizen of the United States, and residing in East Orange, State of New Jersey, have conceived certain new and useful inventions embodied in the Self-Luminous Index-Hand set forth in the following specification and illustrated in the accompanying drawings.

This invention consists in a self-luminous index hand for indicating instruments such as voltmeters, ammeters, and the like, and its object is to provide a neat, durable self-luminous hand of such minute weight and small transverse dimensions as to satisfy the needs of delicate instruments of precision, and of such luminosity as to insure easy reading of the instrument in the dark without recourse to extraneous artificial light.

Figure 1:
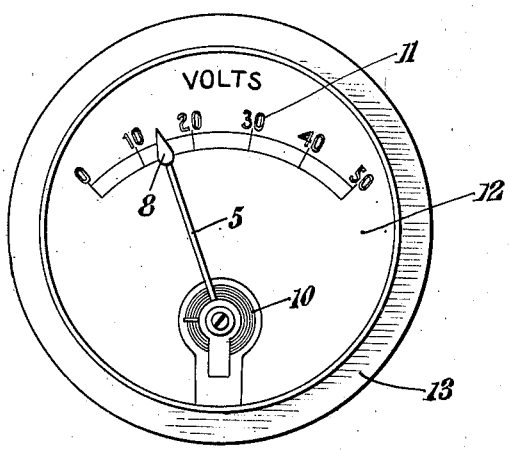
Figure 2:
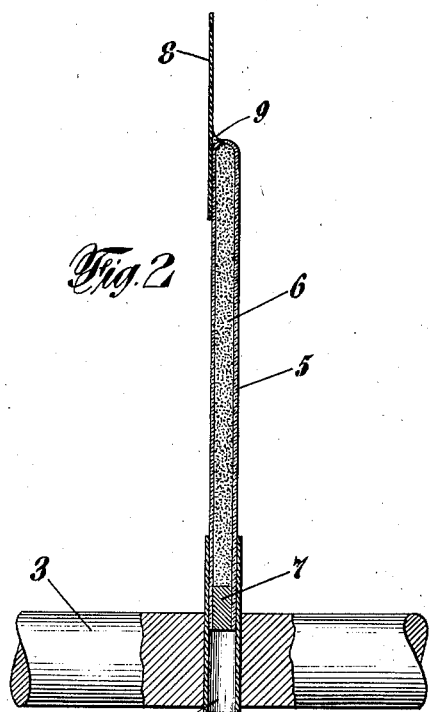

One embodiment of the invention is shown in the accompanying drawings in which:

Figure 1 is a front view of a voltmeter including the self-luminous hand of the invention; and Fig. 2 is a magnified longitudinal sectional view of said self-luminous hand.

In the illustrated embodiment of the invention, the indicating shaft 3 of the instrument is diametrically bored to receive a small aluminum tube 4, which is forced into the shaft hole, or otherwise secured therein. A minute glass tube 5 filled with radio-active self-luminous material 6, is cemented in the aluminum tube with shellac, or otherwise secured therein. The end of the glass tube which enters the aluminum tube may be sealed with a plug 7 of any suitable material, and the outer end of the glass tube may be closed by fusion, or otherwise. A light spatula 8 of foil or celluloid or the like, is secured on the end of and supported by the glass tube by a suitable cement 9, such as shellac for instance.

The glass tube filled with the self-luminous material, projects from the index-carrying member as a simple stem which is unreinforced and self-supporting, and constitutes a fine thread-like self-luminous index hand which is coördinated with self-luminous characters such as 11, painted or otherwise produced on the instrument dial 12 of the voltmeter 13, so that a reading of the instrument may readily be observed in the dark.

In manufacturing the glass tubes, they may be drawn in lengths sufficient to include several of the index hands. Each length may have an integral funnel at one end through which the self-luminous material may be conveniently introduced in the form of a fine powder, until the tube is filled. The contents of the tube may then be impregnated with a thin transparent varnish which seems to improve the appearance of the index hand, probably by making an optic juncture between the whitish powder and the bore surface. The length may then be broken into the sections which are to constitute the individual index hands, and when they have been impregnated by the varnish as aforesaid, the additional sealing of their ends may be omitted, since the varnish at the tube ends will dry and effect a sufficient seal.

The invention comprehends all modifications within the definitions of the following claim:

In an indicating instrument, an index shaft, a tube inserted therein, and a transparent tube secured in and projecting from the first said tube and containing self-luminous material, to serve as a self-luminous index hand.

In testimony whereof I have affixed my signature to this specification.

ALLEN L. HAMLIN.